United States Patent
Liang et al.

(10) Patent No.: US 12,270,378 B2
(45) Date of Patent: Apr. 8, 2025

(54) SWITCHED RELUCTANCE MOTOR DRIVE SYSTEM FOR CONTROLLING PITCH ANGLE OF WIND TURBINE BLADES

(71) Applicant: ENEDYM INC., Hamilton (CA)

(72) Inventors: Jianbin Liang, Hamilton (CA); Lea Pommier, Hamilton (CA); Brock Howey, Paris (CA); Berker Bilgin, Welland (CA)

(73) Assignee: ENEDYM INC., Hamilton (CA)

( * ) Notice: Subject to any disclaimer, the term of this patent is extended or adjusted under 35 U.S.C. 154(b) by 0 days.

(21) Appl. No.: 18/543,189

(22) Filed: Dec. 18, 2023

(65) Prior Publication Data

US 2024/0218855 A1    Jul. 4, 2024

Related U.S. Application Data

(60) Provisional application No. 63/435,839, filed on Dec. 29, 2022.

(51) Int. Cl.
| | |
|---|---|
| *F03D 7/02* | (2006.01) |
| *F03D 9/25* | (2016.01) |
| *F03D 80/60* | (2016.01) |

(52) U.S. Cl.
CPC ......... *F03D 7/0224* (2013.01); *F03D 7/0248* (2013.01); *F03D 9/25* (2016.05);
(Continued)

(58) Field of Classification Search
CPC .... F03D 7/0224; F03D 7/0202; F03D 7/0248; F03D 1/0664; F03D 1/0667;
(Continued)

(56) References Cited

U.S. PATENT DOCUMENTS

| | | | | | |
|---|---|---|---|---|---|
| 4,620,263 | A | * | 10/1986 | Ito | H05K 7/1417 |
| | | | | | 361/736 |
| 4,661,756 | A | * | 4/1987 | Murphy | H02P 25/08 |
| | | | | | 310/168 |

(Continued)

FOREIGN PATENT DOCUMENTS

| | | | | | |
|---|---|---|---|---|---|
| DE | 102016100499 | A1 | * | 7/2017 | ........... G01D 11/245 |
| EP | 2833524 | A1 | * | 2/2015 | ............... H02K 7/14 |

(Continued)

*Primary Examiner* — Courtney D Heinle
*Assistant Examiner* — Ryan C Clark
(74) *Attorney, Agent, or Firm* — SMART & BIGGAR LP; Stephen M. Beney; Sunil R. Rao

(57) ABSTRACT

A system for controlling pitch angle of a blade of a wind turbine is provided. The system may comprise a switched reluctance motor and an inverter. The motor may be configured to be positioned at a hub of the wind turbine and coupled to the blade. The motor may have a stator and a rotor. The stator may have: (i) multiple stator poles and (ii) coil windings around each of the multiple stator poles. The rotor may be rotatably mounted with respect to the stator. The rotor may have multiple rotor poles and a rotor shaft configured to be coupled to the blade to control the pitch angle of the blade. The inverter may be configured to supply electrical power to the coil windings to control motion of the rotor shaft in response to receiving a pitch angle control signal from a pitch angle control system of the wind turbine.

19 Claims, 11 Drawing Sheets

(52) U.S. Cl.
CPC ........ *F03D 80/60* (2016.05); *F05B 2260/903* (2013.01); *F05B 2270/326* (2013.01)

(58) Field of Classification Search
CPC .... F03D 1/0669; F03D 1/0671; F03D 17/029; F03D 80/701; F03D 80/60; F03D 80/601; F03D 80/702; F03D 15/205; F03D 15/207; H02K 11/21; H02K 11/0141; H02K 9/04; H02K 5/10; H02K 5/20; F05B 2260/903; F05B 2270/326; F05B 2270/328; F05B 2270/602; F05B 2270/809
See application file for complete search history.

(56) References Cited

U.S. PATENT DOCUMENTS

| | | | | |
|---|---|---|---|---|
| 4,707,650 | A * | 11/1987 | Bose | H02P 25/0925 318/696 |
| 5,666,268 | A * | 9/1997 | Rix | H05K 7/14327 361/115 |
| 5,703,456 | A * | 12/1997 | Cox | H02P 25/092 318/696 |
| 5,998,896 | A * | 12/1999 | Early | H02K 5/207 310/410 |
| 6,638,122 | B1 * | 10/2003 | Griffith, Sr. | H02P 25/0925 440/6 |
| 6,819,086 | B2 * | 11/2004 | Wobben | H02J 7/32 320/166 |
| 7,764,029 | B2 | 7/2010 | Buente et al. | |
| 9,086,048 | B2 | 7/2015 | Roesmann et al. | |
| 9,562,514 | B2 | 2/2017 | Pasquet et al. | |
| 9,977,411 | B2 * | 5/2018 | Morita | H02P 21/141 |
| 2009/0155075 | A1 * | 6/2009 | Guey | F03D 7/0224 416/162 |
| 2010/0097765 | A1 * | 4/2010 | Suzuki | B60K 6/405 361/699 |
| 2011/0046802 | A1 * | 2/2011 | Jones | F03D 7/0224 700/287 |
| 2011/0142634 | A1 | 6/2011 | Menke et al. | |
| 2011/0249421 | A1 * | 10/2011 | Matsuo | B60L 50/16 318/400.25 |
| 2013/0020804 | A1 * | 1/2013 | Roesmann | H02P 27/08 290/44 |
| 2016/0233737 | A1 * | 8/2016 | Nakamura | H02K 11/33 |
| 2017/0040907 | A1 * | 2/2017 | Goto | H02M 3/28 |
| 2018/0103536 | A1 * | 4/2018 | Pickering | H01M 10/425 |
| 2019/0044110 | A1 * | 2/2019 | Sheeks | H01M 50/204 |
| 2019/0165634 | A1 * | 5/2019 | Whaley | H02K 1/182 |
| 2019/0285058 | A1 * | 9/2019 | Hoffmann | G01R 31/3647 |
| 2020/0161922 | A1 * | 5/2020 | Okuhata | H02K 5/00 |
| 2021/0195787 | A1 * | 6/2021 | Legendre | H05K 7/209 |
| 2021/0257877 | A1 * | 8/2021 | Hung | H02K 5/18 |
| 2021/0320561 | A1 * | 10/2021 | Tucker | H02K 7/1025 |
| 2022/0200467 | A1 * | 6/2022 | Andris | H02M 7/53871 |

FOREIGN PATENT DOCUMENTS

| | | |
|---|---|---|
| WO | 2005019642 A1 | 3/2005 |
| WO | 2015001403 A1 | 1/2015 |
| WO | 2018079863 A1 | 5/2018 |

* cited by examiner

SWITCHED RELUCTANCE MOTOR DRIVE SYSTEM FOR CONTROLLING PITCH ANGLE OF WIND TURBINE BLADES

CROSS REFERENCE TO RELATED APPLICATIONS

This application claims the benefit of U.S. Provisional Application No. 63/435,830 filed Dec. 29, 2022, the entire contents of which is incorporated herein by reference.

FIELD

This document generally relates to switched reluctance motor drive systems, and specifically to switched reluctance motor drive systems for controlling a pitch angle of a blade of a wind turbine.

BACKGROUND

The energy generation sector is a significant contributor to global greenhouse gas emission. Wind turbines are devices that convert the kinetic energy of wind into electrical energy. Wind turbines are an important source of renewable energy and are used in many countries to reduce reliance on fossil fuels for energy generation.

Wind turbines typically have multiple blades to capture wind energy that is used to rotate a turbine shaft. The turbine shaft is coupled to a generator that converts the input mechanical energy of the shaft into output electrical energy that can be fed into an electrical grid.

Generally, the wind turbine has a pitch angle control system that adjusts the pitch angle of the wind turbine blades to control the amount of captured wind energy. The pitch angle control system can adjust the pitch angle of the wind turbine blades to maintain an approximately constant rotation speed of the turbine shaft and thereby provide an approximately constant output electrical power under varying wind conditions. In certain extreme situations (e.g., when the wind speed is too high), the pitch angle control system may adjust the pitch angle of the blades to prevent rotation and protect the blades.

SUMMARY

The following summary is provided to introduce the reader to the more detailed discussion to follow. The summary is not intended to limit or define any claimed or as yet unclaimed invention. One or more inventions may reside in any combination or sub-combination of the elements or process steps disclosed in any part of this document including its claims and figures.

According to some aspects, a system for controlling a pitch angle of a blade of a wind turbine is provided. The system may comprise a switched reluctance motor and an inverter. The motor may be configured to be positioned at a hub of the wind turbine and coupled to the blade. The motor may have a stator and a rotor. The stator may have: (i) multiple stator poles and (ii) coil windings around each of the multiple stator poles. The rotor may be rotatably mounted with respect to the stator. The rotor may have multiple rotor poles and a rotor shaft configured to be coupled to the blade to control the pitch angle of the blade. The inverter may be configured to supply electrical power to the coil windings to control motion of the rotor shaft in response to receiving a pitch angle control signal from a pitch angle control system of the wind turbine.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Figure 1:
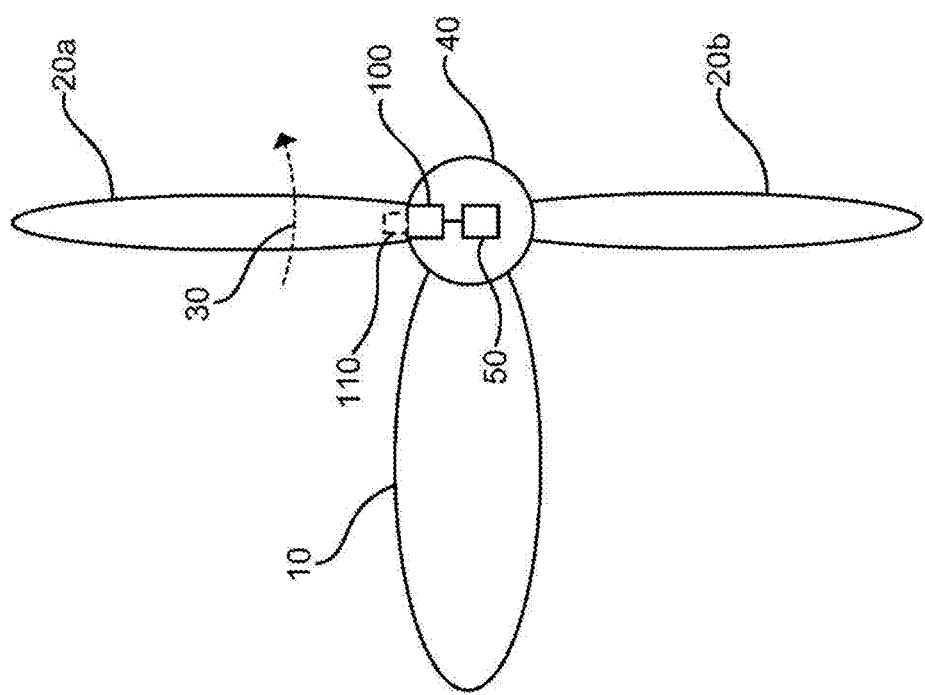
FIG. 1 is a schematic illustration of a switched reluctance motor drive system for controlling a pitch angle of a blade of a wind turbine, in accordance with an embodiment.

Numerous embodiments are described in this application and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, a group of elements are said to 'collectively' perform an act where that act is performed by any one of the elements in the group, or performed cooperatively by two or more (or all) elements in the group.

As used herein and in the claims, a first element is said to be "received" in a second element where at least a portion of the first element is received in the second element unless specifically stated otherwise.

Some elements herein may be identified by a part number, which is composed of a base number followed by an alphabetical or subscript-numerical suffix (e.g., 112*a*, or 112₁). Multiple elements herein may be identified by part numbers that share a base number in common and that differ by their suffixes (e.g., 112₁, 112₂, and 112₃). All elements with a common base number may be referred to collectively or generically using the base number without a suffix (e.g., 112).

As used herein and in the claims, "up", "down", "above", "below", "upwardly", "vertical", "elevation" and similar terms are in reference to a directionality generally aligned with (e.g., parallel to) gravity. However, none of the terms referred to in this paragraph imply any particular alignment between elements. For example, a first element may be said to be "vertically above" a second element, where the first element is at a higher elevation than the second element, and irrespective of whether the first element is vertically aligned with the second element.

The annual production of wind energy by a wind turbine is typically measured using an annual capacity factor (CF) of the wind turbine. The annual CF is defined as the percentage of average output power produced during a year divided by the rated maximum output power that the turbine can produce. A high annual CF can reduce the cost of energy generation using wind turbines. According to the U.S. Department of Energy, the annual CF values of wind turbines generally range from 26% to 52% with typical fleet averages of around 35%.

The annual CF generally depends on the wind conditions and the reliability of the wind turbine. The wind conditions for any specific site may be largely out of human control, but the annual CF can be increased by increasing the reliability of the wind turbines. Wind turbines are often located in remote/offshore locations and any repair activities can be challenging and cause several days of downtime. Increased reliability of the wind turbines can reduce the frequency of repair activities and associated downtimes.

The performance of the pitch angle control system can have a significant impact on the reliability of the wind turbine. Any failures or faults in the pitch angle control system may lead to significant downtime and/or damage to the wind turbine. For example, a fault in the pitch angle control system may cause the wind turbine to operate sub-optimally or completely stop operating. Indirectly, a failure of the pitch angle control system to provide sufficient protection during high wind speed conditions may lead to a fault in other critical components of the wind turbine such as the blades, generator, and/or gearboxes. Improved reliability of the pitch angle control system can improve the overall reliability of the wind turbine, reduce repair activities/downtime and thereby increase the annual CF of the wind turbine.

There can be several challenges in achieving high reliability for pitch angle control systems of wind turbines. The pitch angle control system may have multiple motor drive systems, with each motor drive system controlling the pitch angle of one blade of the wind turbine. For an example wind turbine with three blades, the pitch angle control system may have three motor drive systems and a failure in any one of the motor drive systems may cause the wind turbine to operate sub-optimally or completely stop operating.

For example, the reliability of the pitch angle control system may be reduced by frequent failures, low efficiency and low reliability of brushed DC motor drive systems used for controlling the pitch angle of the blades. The brushed DC motors have a heavy and complex structure including rotor armature windings and associated commutators and brushes. A failure of any of these components can cause significant repair downtime.

The operating environment of the wind turbines can have a wide range of ambient temperatures and high vibrations. This can be a challenging operating environment for motor drive systems. The brushed DC motor drive systems may use an additional fan on the motor shaft to address overheating issues when the ambient temperature is high. However, the additional fan can consume additional power and may also not provide sufficient cooling at high ambient temperatures.

Described herein are switched reluctance motor drive systems for controlling the pitch angle of the blades of wind turbines. The disclosed switched reluctance motor drive system can provide a more robust construction, higher reliability, and lower cost compared with brushed DC motor drive systems. The disclosed switched reluctance motor drive system may also provide higher efficiency and generate lower losses and heat compared with a brushed DC motor drive system. A switched reluctance motor may not require any rotor windings and can therefore avoid bearing failure issues related to deterioration of the lubrication film of rotor bearings caused by the rotor winding current in a brushed DC motor.

Wind turbines can often be located in harsh environments and dust and water from the ambient environment can cause bearing failures in motor drive systems used in wind turbines. There may also be additional dust generated by the wear of the frictional discs in the mechanical brakes of motor drive systems. The additional dust generated by the wear of the frictional discs may cause increased failure of the bearings located in proximity of the mechanical brakes. The disclosed switched reluctance motor drive system may include a completely sealed housing enclosure providing ingress protection against dust and water. This may provide superior ingress protection compared with brushed DC motor drive systems that require openings in the housing enclosure to enable replacement of worn brushes. Additionally, the disclosed switched reluctance motor drive system may use regenerative electrical braking to reduce the wear of the frictional discs in the mechanical brake.

Referring now to FIG. 1, shown therein is a schematic illustration of a switched reluctance motor drive system 100 for controlling a pitch angle of a blade 20a of a wind turbine 10 in a pitching direction 30, in accordance with an embodiment. The wind turbine 10 may have multiple blades (e.g., blades 20a and 20b shown in FIG. 1), a wind turbine hub 40, and a pitch angle control system 50.

The wind turbine 10 may have any suitable number of blades 20 for capturing wind energy. For example, the wind turbine 10 may have three blades (two of which are shown in FIG. 1). In other examples, the wind turbine may have greater or fewer than three blades 20.

Figure 2:
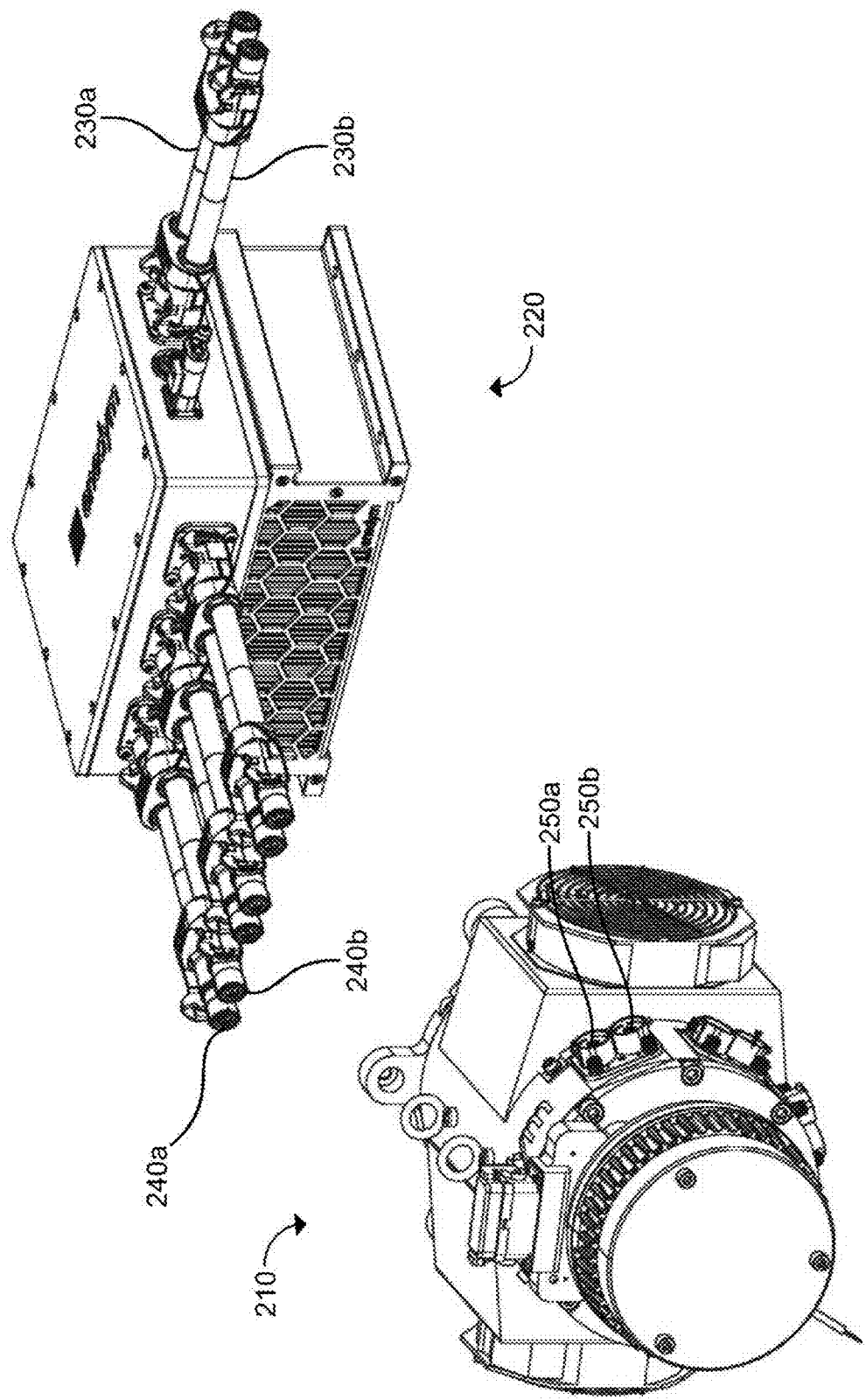
FIG. 2 is a perspective view of a switched reluctance motor and an inverter of the switched reluctance motor drive system of FIG. 1.
Figure 3A:
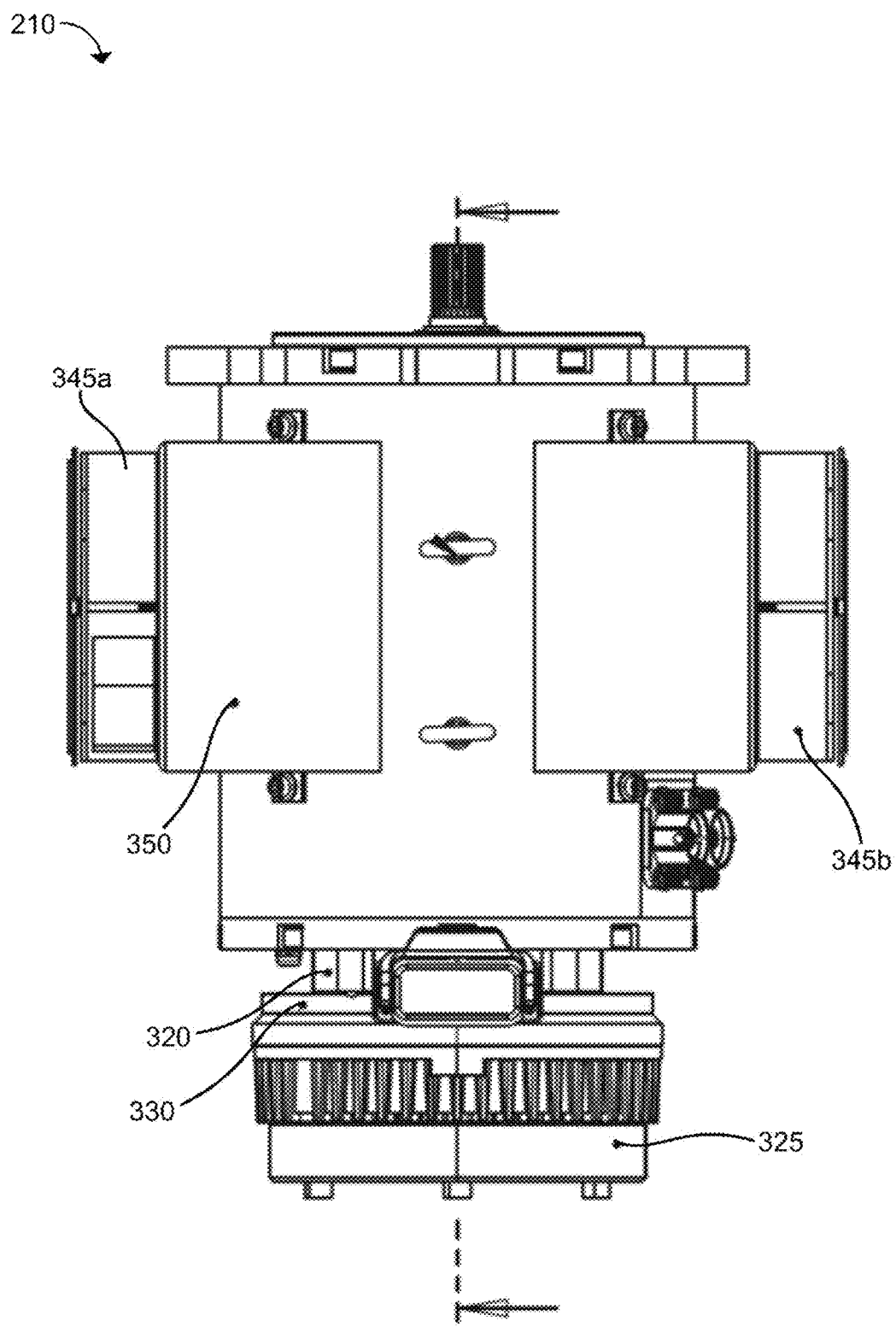
FIG. 3A is a top view of the switched reluctance motor of FIG. 2.
Figure 3B:
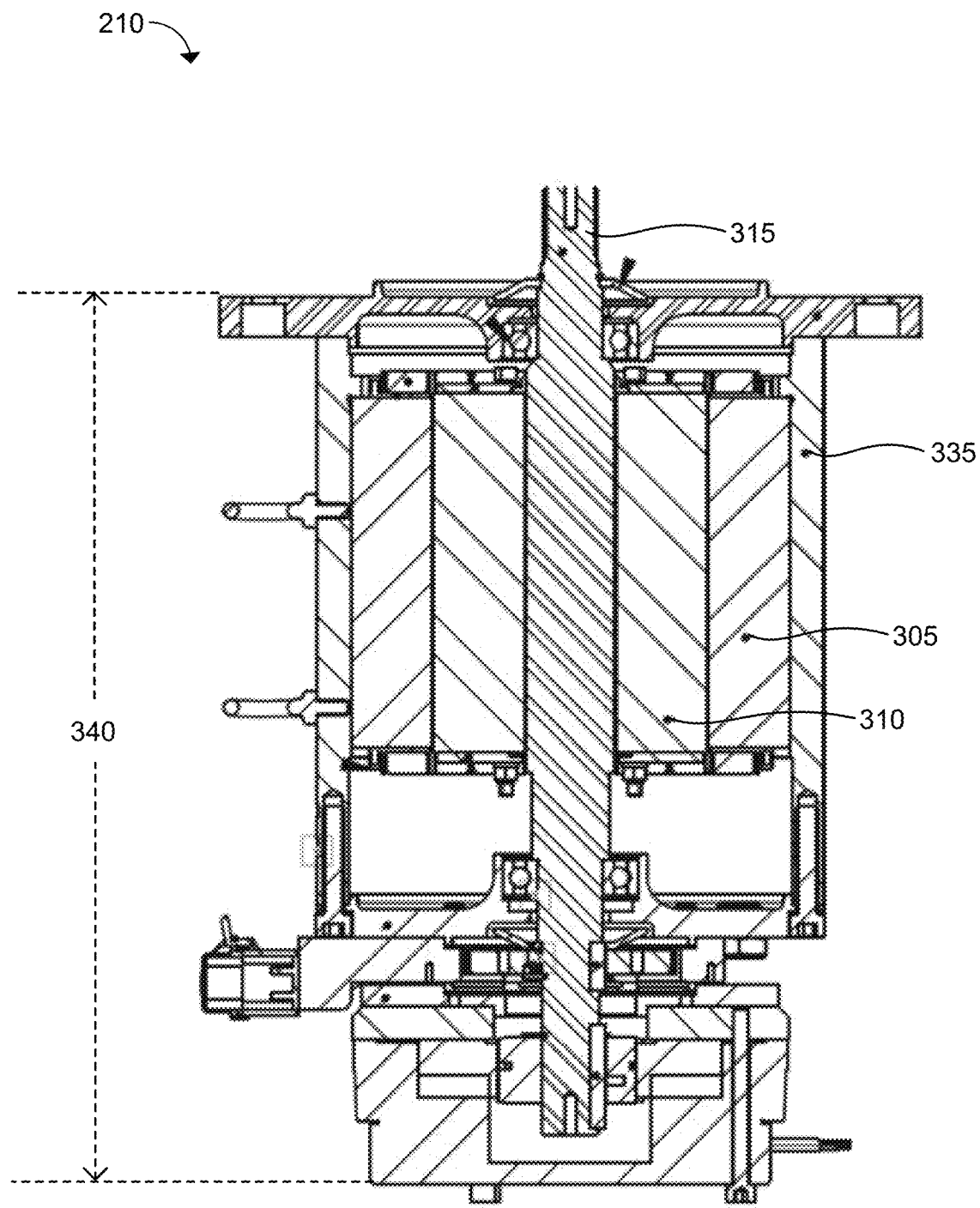
FIG. 3B is a cross-sectional top view of the switched reluctance motor of FIG. 2.

The switched reluctance motor drive system 100 can have any design suitable to control the pitch angle of blade 20a in pitching direction 30. The switched reluctance motor drive system 100 may include a switched reluctance motor and an inverter. Reference is next made to FIGS. 1 and 2. FIG. 2 is a perspective view of a switched reluctance motor 210 and an inverter 220 of the switched reluctance motor drive system 100.

Inverter 220 may have any design suitable to receive input electrical power from a DC power source of wind turbine 10 and provide electrical power to switched reluctance motor 210. The switched reluctance motor drive system 100 may include a DC connection 230 to provide electrical power from a DC power source of wind turbine 10 to the inverter 220.

In some embodiments, DC connection 230 may include cable connectors. For example, as shown in FIG. 2, DC connection 230 may include a pair of cable connectors 230a and 230b. The cable connectors 230a and 230b may include shielded cables to provide higher resistance to electromagnetic interference (EMI).

The switched reluctance motor drive system 100 may also include an AC connection 240 to provide AC electrical power from the inverter 220 to switched reluctance motor 210. In some embodiments, AC connection 240 may include a pair of cable connectors for each phase of AC electrical power provided to switched reluctance motor 210. For example, as shown in FIG. 2, AC connection 240 may include three pairs of cable connectors (including one pair of cable connectors labelled 240a and 240b in FIG. 2) to provide three-phase AC electrical power from inverter 220 to switched reluctance motor 210. The cable connectors 240a and 240b may include shielded cables to provide higher resistance to EMI.

Switched reluctance motor 210 may include motor connection 250 to receive AC electrical power from inverter 220. Switched reluctance motor 210 may include a pair of connectors for each phase of the AC electrical power. For example, as shown in FIG. 2, motor connection 250 may include three pairs of connectors (including one pair of motor connectors labelled 250a and 250b in FIG. 2) to receive the AC electrical power.

The switched reluctance motor 210 may be positioned at hub 40 of wind turbine 10. In some embodiments, the inverter 220 may also be positioned in proximity to the switched reluctance motor 210 at hub 40 of wind turbine 10. The switched reluctance motor 210 may be mechanically coupled to blade 20a to control the pitch angle of blade 20a.

For example, a rotor shaft of switched reluctance motor 210 may be coupled to blade 20a via a gearbox assembly 110. In some examples, the rotor shaft may be directly coupled to blade 20a without a gearbox assembly.

Figure 4:
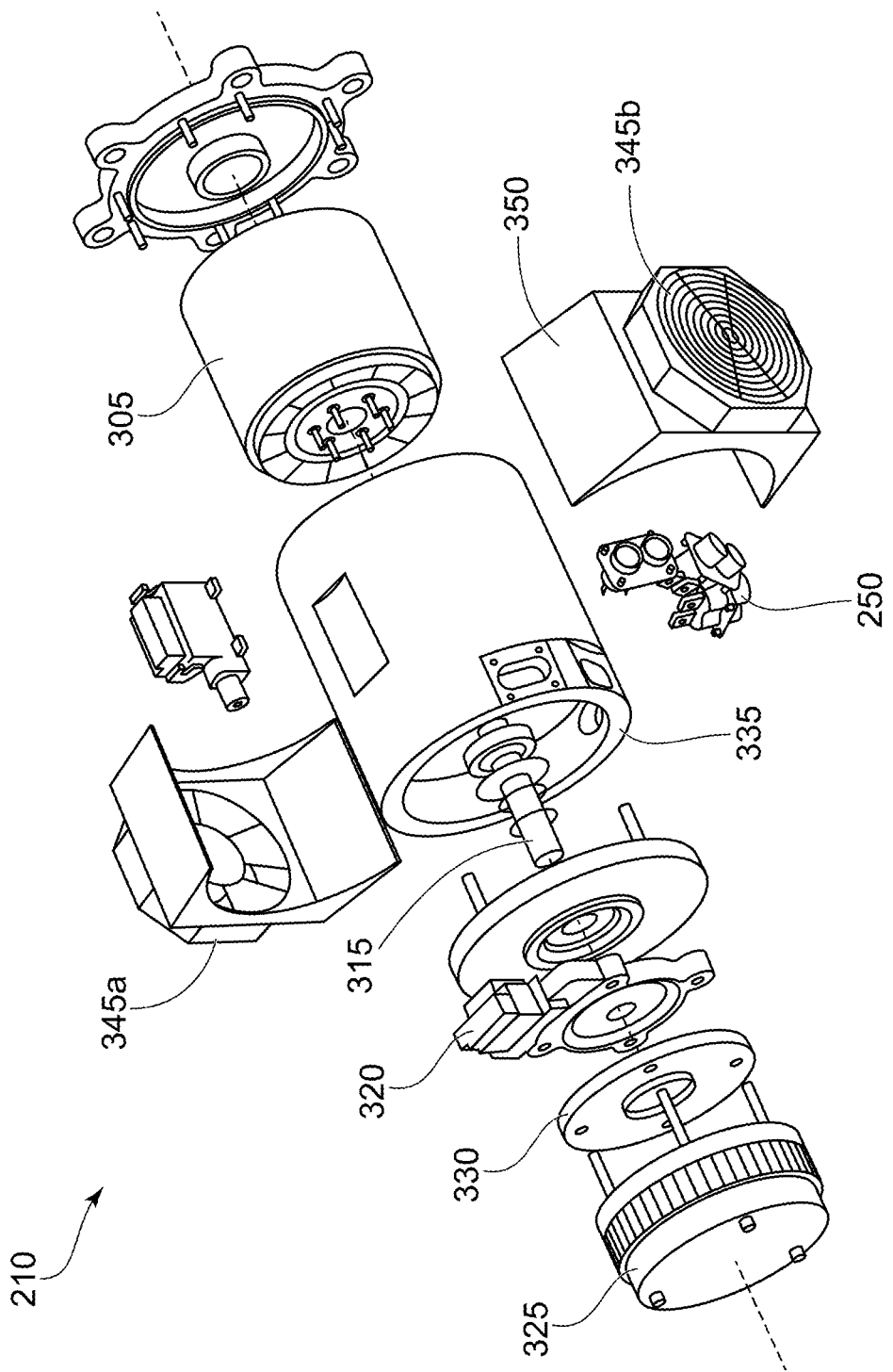
FIG. 4 is an exploded view showing components of the switched reluctance motor of FIG. 2.
Figure 5:
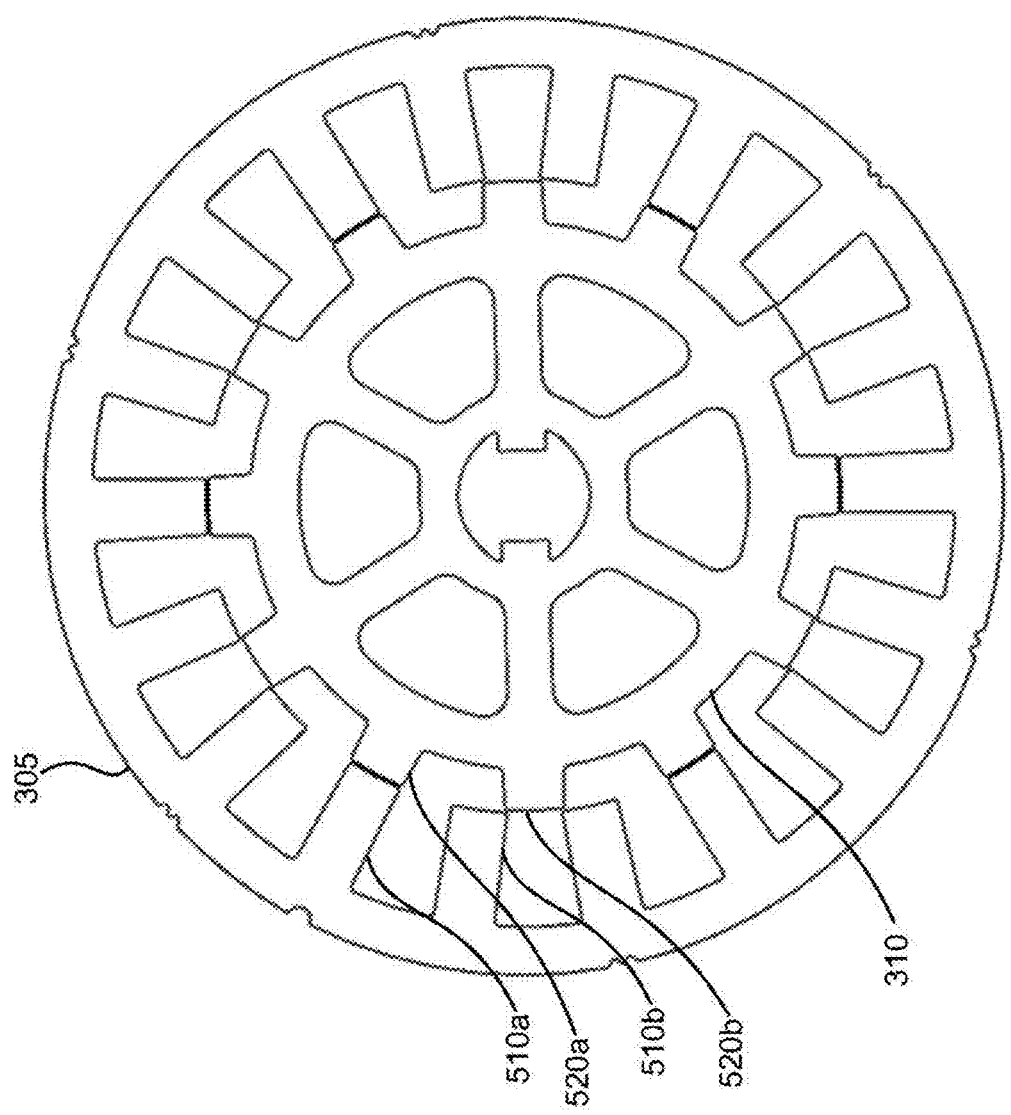
FIG. 5 is a schematic diagram of an example stator and rotor pole configuration of the switched reluctance motor of FIG. 2.
Figure 6:
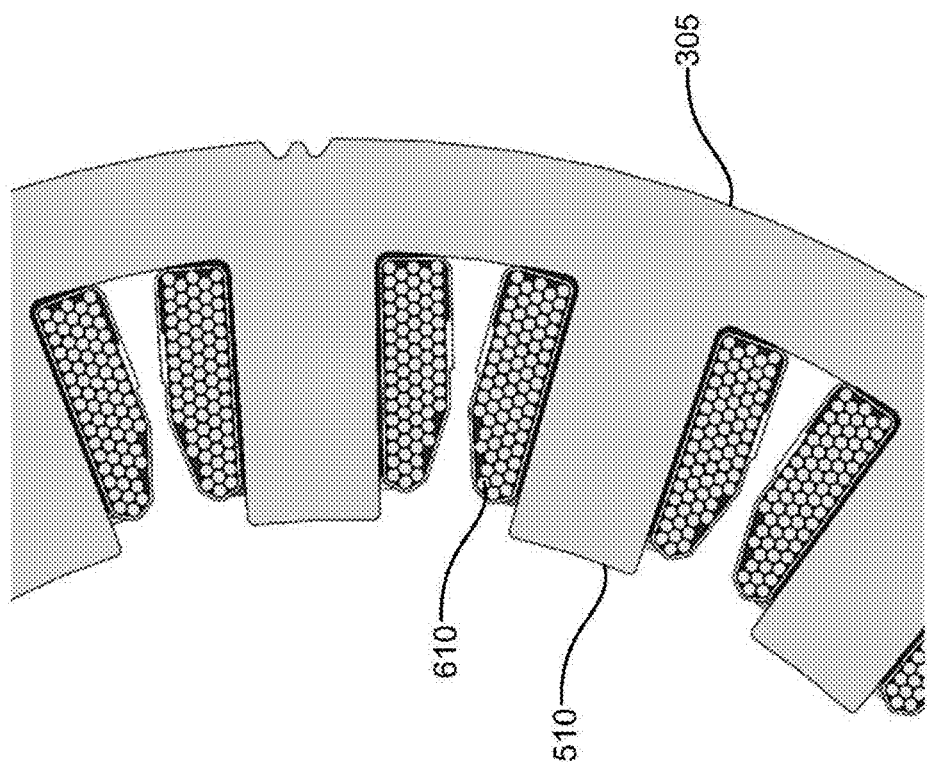
FIG. 6 is a schematic diagram showing attachment of example coil windings to stator poles of the switched reluctance motor of FIG. 2.

Reference is next made to FIGS. 3 to 6. FIGS. 3A and 3B are a top view and a cross-sectional top view respectively of the switched reluctance motor 210. FIG. 4 is an exploded view showing components of the switched reluctance motor 210. FIG. 5 is a schematic diagram of an example stator and rotor pole configuration of the switched reluctance motor 210. FIG. 6 is a schematic diagram showing attachment of example stator windings to stator poles of the switched reluctance motor 210.

Switched reluctance motor 210 may include a stator 305 and a rotor 310 rotatably mounted with respect to stator 305. In some embodiments, stator 305 and rotor 310 may be made of lamination sheets instead of a single solid piece of material. This may help to reduce eddy current losses. For example, stator 305 and rotor 310 may be made of laminated steel. The thickness of the lamination sheets may range from 0.34 mm to 0.5 mm. In other embodiments, stator 305 and rotor 310 may be made of a single solid piece of steel material or soft magnetic composites instead of lamination sheets. This may reduce the manufacturing cost, but may result in reduced efficiency due to eddy current losses or reduced output torque due to lower magnetic flux density.

Stator 305 may have multiple stator poles 510 (for the example stator and rotor pole configuration shown in FIG. 5, the stator 305 has 18 stator poles 510, two of which are labelled 510a and 510b in FIG. 5). Rotor 310 may have multiple rotor poles 520 (for the example stator and rotor pole configuration shown in FIG. 5, the rotor 310 has 12 rotor poles 520, two of which are labelled 520a and 520b in FIG. 5).

The number of stator poles 510 may be selected in combination with the number of rotor poles 520 to ensure proper operation of the switched reluctance motor 210. In some embodiments, stator 305 may have at least 6 stator poles, such as 6-48 stator poles. For example, switched reluctance motor 210 may include an 18/12 pole configuration with 18 stator poles and 12 rotor poles. In other examples, other pole configurations (e.g., 6/4, 12/8, 24/16) may be used depending on various factors including torque density and torque ripple, end winding length, and heat dissipation from the winding towards the motor housing.

Stator 305 may have coil windings 610 around each of the multiple stator poles 510 of stator 305. Coil windings 610 may include concentrated windings designed to achieve a low current density and thereby reduce copper losses. For an example 18/12 pole configuration with 18 stator poles, coil windings 610 may include a total of 18 coil windings, with one coil winding around each of the 18 stator poles. The coil windings may be organized into groups, where all the coil windings of one group are connected to the same phase of the AC voltage provided by the inverter. In some embodiments, there may be an equal number of coil windings in each group. For example, if a 3-phase input is provided from the inverter to the coil windings 610, the total of 18 coil windings may be organized into three groups with six coil windings in each group.

The concentrated coil windings 610 may significantly reduce the electromagnetic interaction between the multiple phases and may also enhance the fault tolerance capability and reliability of the switched reluctance motor 210. The use of the concentrated winding configuration may also reduce the required length of the winding and can reduce the weight and volume of the coil windings compared with brushed DC motor drive systems.

Each coil winding may include multiple turns and/or multiple strands. The number of turns may be selected based on required torque-speed characteristics at continuous, peak, and overload operating conditions while meeting the required efficiency targets. The number of strands may be selected based on current density limits and to reduce the proximity losses while keeping the fill factor at a manufacturable level.

Rotor 310 may not include any coils, permanent magnets, commutators, or brushes. Rotor 310 may have a rotor shaft 315 configured to be coupled to the blade of the wind turbine to control the pitch angle of the blade. Rotor shaft 315 can have any design suitable to transfer the output mechanical energy of the switched reluctance motor drive system 100 to the blade of the wind turbine. In the illustrated example, the rotor shaft 315 is formed as a shaft that may be rotatably coupled to the blade of the wind turbine (for example, via a gearbox assembly).

In some embodiments, the switched reluctance motor 210 may include a position encoder 320. The position encoder 320 may have any suitable design to sense an angular position of rotor 310. For example, position encoder 320 may include an absolute encoder. In other examples, position encoder 320 may include an incremental encoder configured to sense an angular position of rotor 310 relative to a reference position.

The position encoder 320 may provide a rotor position signal indicating the sensed angular position to the inverter. In some embodiments, the position encoder 320 may also be configured to sense a velocity of rotor 310. The position encoder 320 may provide a rotor velocity signal indicating the sensed rotor velocity to the inverter.

In some embodiments, the switched reluctance motor 210 may have an electro-mechanical brake 325. The electro-mechanical brake 325 may provide frictional braking action for rotor shaft 315 in response to an electrical control signal.

The magnetic field effects generated by the electrical control signals of the electro-mechanical brake 325 may cause EMI for the position encoder 320. The EMI may reduce the operational reliability and/or accuracy of the position encoder 320.

In some embodiments, the switched reluctance motor 210 may have a spacer 330 positioned between the electro-mechanical brake 325 and the position encoder 320 to shield the position encoder 320 from the EMI generated by the electro-mechanical brake 325. Spacer 330 may be made of any suitable material that provides EMI shielding effects. For example, spacer 330 may be made of metallic EMI shielding materials that limit any magnetic fields from the electro-mechanical brake 325 reaching the position encoder 320 to less than 0.2 T.

The switched reluctance motor 210 may also include a motor housing 335. The motor housing 335 may have any suitable design to provide a sealed housing enclosure for the components of switched reluctance motor 210. Motor housing 335 may be made of any suitable material based on the ambient environment of the wind turbine. For example, motor housing 335 may be made of a metallic material.

Motor housing 335 may provide a completely sealed housing that protects the components of switched reluctance motor 210 against dust and water. This may improve the reliability of the switched reluctance motor 210 when operating in harsh ambient environments.

In some embodiments, motor housing 335 may have a motor housing length 340 in a range from 400 mm to 550 mm (e.g., 475 mm). This may provide a more compact design and lighter weight compared with brushed DC motor drive systems. For example, the total weight of the switched reluctance motor drive system 100 may be in a range from 95 kg to 105 kg (e.g., 100 kg). The weight of the switched reluctance motor drive system 100 may be lower compared with brushed DC motor drive systems.

The switched reluctance motor 210 may have one or more fans to provide cooling action for the components of switched reluctance motor 210. For the illustrated example, the switched reluctance motor 210 has two fans 345a and 345b. In other examples, the switched reluctance motor 210 may have fewer than two fans (e.g., 0 or 1) or greater than two fans (e.g., 3-6 etc.).

In some embodiments, the switched reluctance motor 210 may also have a fan shroud 350. The fan shroud 350 may have any suitable design to channel the airflow generated by fans 345 around motor housing 335 to provide efficient cooling of the switched reluctance motor 210.

Figure 7:
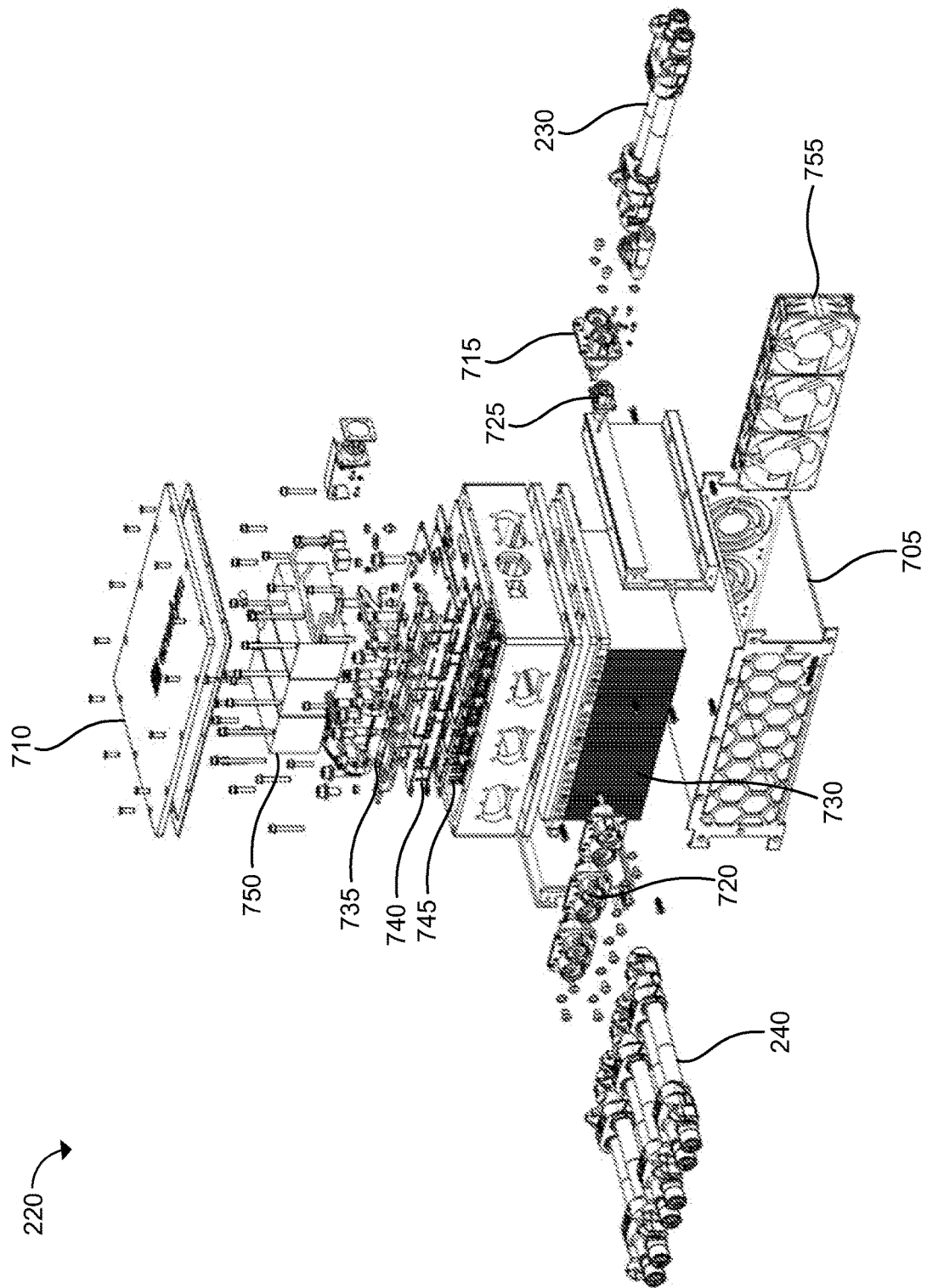
FIG. 7 is an exploded view of the inverter of FIG. 2.

Referring next to FIG. 7, shown therein is an exploded view of inverter 220 of FIG. 2. Inverter 220 may include an inverter housing 705, DC connectors 715, AC connectors 720, data connectors 725, heatsink assembly 730, control board 735, busbar assembly 740, switching devices 745, and capacitor devices 750.

Inverter housing 705 may have any suitable design to provide a sealed housing enclosure for the components of inverter 220. In some embodiments, the inverter housing 705 may include a sealed lid 710. The volume of the inverter housing 705 may be in a range from 15.5 L to 17.5 L (e.g., 16 L) to provide a compact and space-efficient design.

Inverter housing 705 may be made of any suitable material based on the ambient environment of the wind turbine. In some embodiments, inverter housing 705 may be made of a metallic material. For example, inverter housing 705 may include a gasket-sealed aluminum enclosure to provide ingress protection against dust and water. The gasket-sealed aluminum enclosure may provide superior ingress protection compared with an unsealed plastic enclosure.

DC connectors 715 may have any suitable design to couple with DC connection 230 and receive the input DC power from a power source of the wind turbine. In some embodiments, DC connectors 715 may be IP68-rated to provide higher safety by reducing shorting and electrocution hazards compared with exposed bare copper connections. The IP-68 rated connections may also provide higher reliability connections when switched reluctance motor drive system 100 is positioned in challenging high-vibration ambient environments.

Data connectors 725 may have any suitable design to provide data communication connections with external devices. For example, data connectors 725 may provide a communication connection with pitch angle control system 50 of wind turbine 10. In some embodiments, the data connectors 725 may be configured to receive input signals and provide output signals using a RS-485 standard, a controller area network (CAN) communication protocol, or a joint test action group (JTAG) standard. Data connectors 725 may be fully shielded and IP68-rated to provide high safety performance, signal transmission performance and vibration resistance.

AC connectors 720 may have any suitable design to couple with AC connection 240 and provide power to switched reluctance motor 210. In some embodiments, AC connectors 720 may be IP68-rated to provide higher safety by reducing shorting and electrocution hazards compared with exposed bare copper connections. The IP-68 rated connections may also provide higher reliability connections when switched reluctance motor drive system 100 is positioned in challenging high-vibration ambient environments.

Heatsink assembly 730 may have any suitable design to dissipate heat away from inverter 220. For example, heatsink assembly 730 may include multiple fins. In some embodiments, heatsink assembly may include one or more fans 755. Fans 755 may include multiple fans configured to increase cooling air flow for inverter 220.

In some embodiments, heatsink assembly 730 may be made of aluminum material. Overheating of electrical components can be a leading cause of failure of components of electric motor drive systems used to control pitch angle of wind turbine blades. The improved heat dissipation performance of heatsink assembly 730 may reduce failure rates and increase reliability of the disclosed switched reluctance motor drive system.

Control board 735 may have any suitable design to control various operations of inverter 220 and/or switched reluctance motor 210. For example, control board 735 may include a digital signal processor (DSP) chip to perform various processing operations related to operations of inverter 220 and/or switched reluctance motor 210.

In some embodiments, control board 735 may receive a pitch angle control signal from the pitch angle control system of the wind turbine. Control board 735 may also receive a rotor position signal and/or a rotor velocity signal from switched reluctance motor 210. Control board 735 may determine the amount of electric current/power to be provided to the coil windings of a switched reluctance motor based on the received pitch angle control signal, rotor position signal and/or rotor velocity signal. For example, control board 735 may be configured to supply electrical power to the coil windings 610 of the switched reluctance motor 210 based on received pitch angle control signal, rotor position signal and/or rotor velocity signal.

After determining the amount of electric current/power to be provided, control board 735 may control the operation of switching devices 745 and capacitor devices 750 to control the supplied electrical current/power to the coil windings. For example, control board 735 may control the supplied electrical current to the coil windings 610 of switched reluctance motor 210 to control motion of rotor shaft 315 of in response to a received pitch angle control signal.

As an example, the pitch angle control system of the wind turbine may generate a pitch angle control signal for changing the pitch angle of a blade of the wind turbine by 5° based on a change in ambient wind conditions. In response to the pitch angle control signal, the control board 735 may control the electric current to the coil windings to rotate the rotor shaft by an amount corresponding to the 5° change in the pitch angle of the blade.

The busbar assembly 740 may have any suitable design to provide electrical interconnections for switching devices 745 and capacitor devices 750. For example, busbar assembly 740 may include multiple copper busbars. In some embodiments, the busbar assembly 740 may be solely used for current distribution. This may provide higher reliability compared with systems where busbar assemblies are also used for cooling of the switching devices and/or to provide mechanical support for printed circuit boards.

The heatsink assembly 730 may include multiple mounting screws that secure the position of the busbar assembly 740. This may reduce the mechanical strain, caused by vibrations of the wind turbine ambient environment, on switching devices 745 and/or capacitor devices 750 that are attached to the busbar assembly 740.

In some embodiments, inverter 220 may be configured to supply multiple-phase electrical power to the coil windings of the switched reluctance motor and the busbar assembly 740 may include multiple copper busbars arranged in a symmetrical layout. The symmetrical layout of the copper busbars may reduce unbalanced operation between the multiple phases. The unbalanced currents can be a source of unsteady inverter operation and potential physical damage to the product (e.g., overheating of components connected to the busbar assembly).

Figure 8:
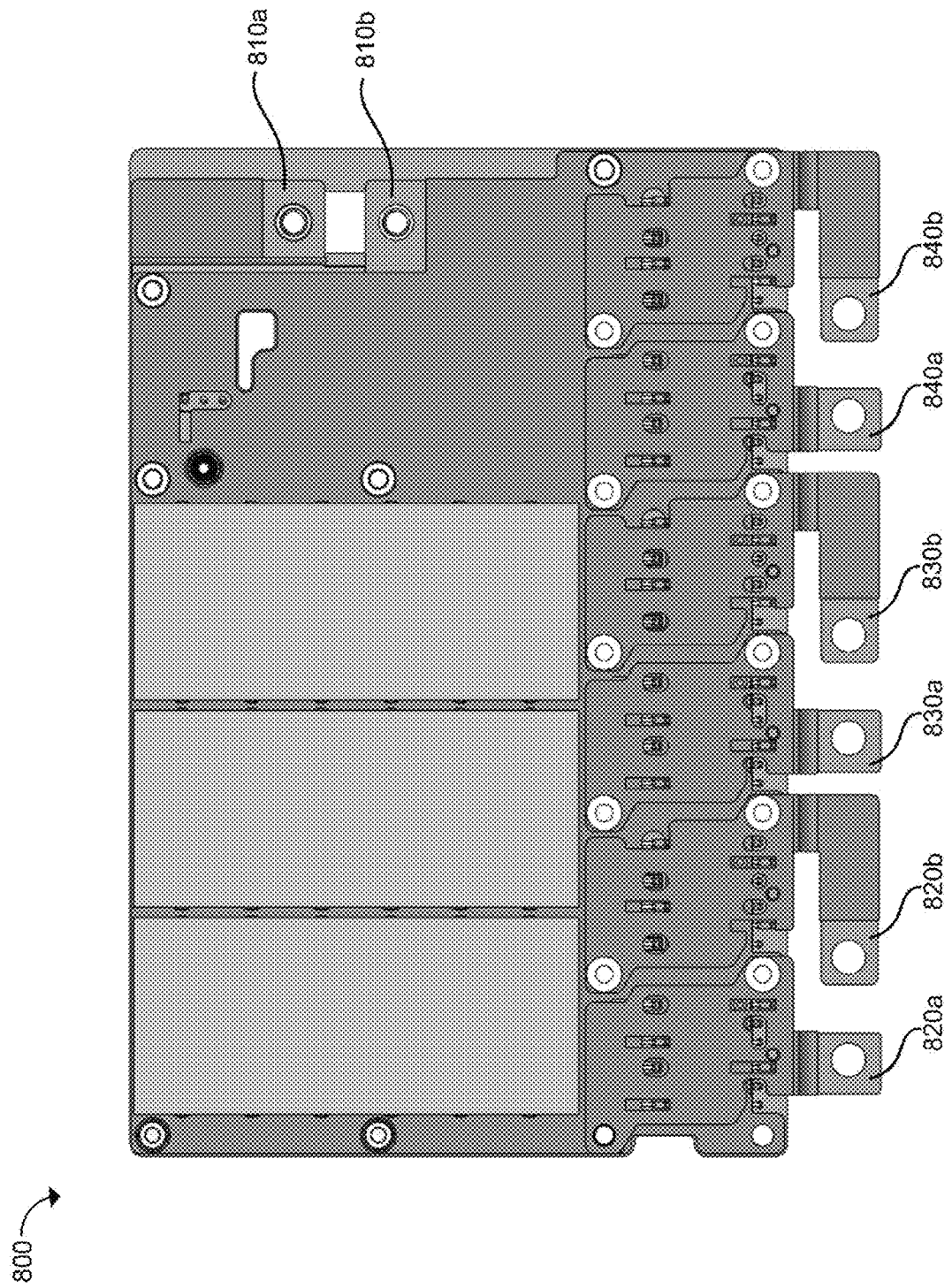
FIG. 8 is a schematic diagram of an example symmetrical layout of a busbar assembly of the inverter of FIG. 2.

Reference is next made to FIGS. 7 and 8. FIG. 8 shows a schematic diagram of an example symmetrical layout 800 of busbar assembly 740. The busbar assembly 740 may include a pair of input DC busbars 810a and 810b. Busbar assembly 740 may also include three pairs of output AC busbars—820a and 820b, 830a and 830b, 840a and 840b. In other examples, busbar assembly 740 may include a different number of pairs of output AC busbars.

Layout 800 may have any suitable symmetrical design such that all the multiple pairs of output AC busbars and the pair of input DC busbars have the same copper footprint as each other. The parallel connections of switching devices 745 and capacitor devices 750 to the copper busbars may also be identical. The current flowing through the copper conductor may be affected by the parasitic components of the busbars causing unbalanced currents between the phases. The symmetrical layout of the copper busbars may enable similar current paths between the components for each phase resulting in similar parasitic components and thereby minimizing the current deviation between the phases.

The switching devices 745 may include multiple switching devices and may have any suitable design to control the current provided to the coil windings of the switched reluctance motor. For example, switching devices 745 may include insulated-gate bipolar transistors (IGBTs) and/or diodes.

Each of the switching devices 745 may be in direct electrical contact with the busbar assembly 740 (for example, each switching device may be in direct electrical contact with a copper busbar of the busbar assembly 740). The direct electrical contact with the busbar assembly may enabled reduced electrical resistance and higher performance compared with systems where the switching devices are soldered to a printed circuit board (PCB) that is electrically connected to copper busbars using screws. The direct electrical contact between the switching devices 745 and the busbar assembly 740 may also reduce parasitic circuit components by shortening the current path and, thereby minimizing voltage spikes, EMI, and switching losses. Improved vibration resistance and cost reduction may also be achieved by avoiding the use of a PCB as intermediate layer between the switching devices and the copper busbar.

In some embodiments, the switching devices 745 may be connected in parallel to provide increased system reliability through redundancy. However, increasing the number of switching devices 745 connected in parallel may also increase the risk of unbalanced currents that may cause increased failure of switching devices 745. The total number of switching devices 745 connected in parallel may be optimized based on the winding current requirements of the system to provide a balance between increased redundancy and reducing the unbalanced currents.

In some embodiments, the switching devices 745 may be directly mounted on heatsink assembly 730 for improved heat dissipation. This may provide improved thermal performance compared with systems where the heat dissipation path is shared with the electrical connection to the busbar assembly.

Figure 9:
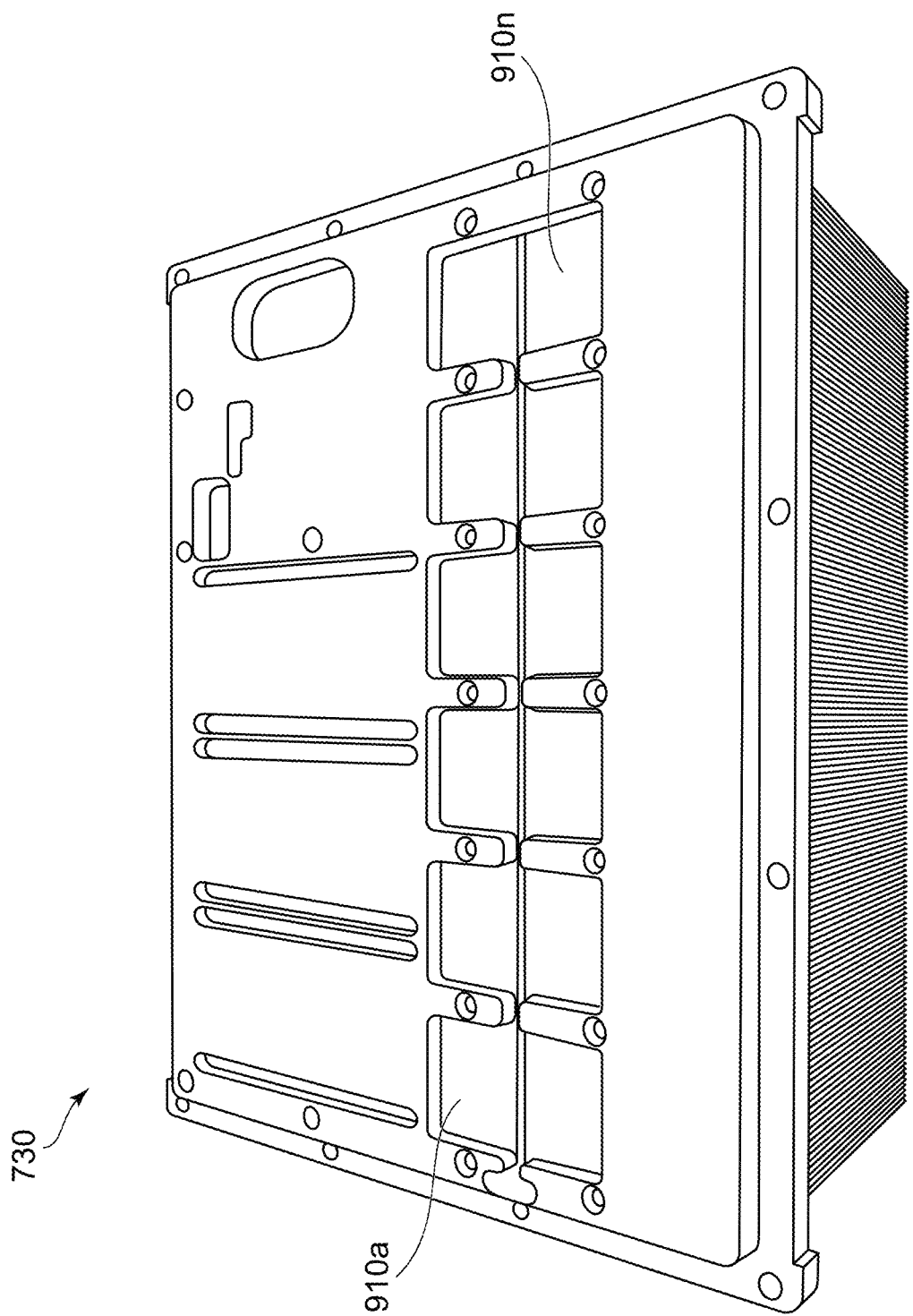
FIG. 9 is an image of an example heatsink assembly of the inverter of FIG. 2.

Referring now to FIG. 9, shown therein is an example heatsink assembly 730 that can enable switching devices 745 to be directly mounted. Heatsink assembly 730 may include multiple rectangular slots 910a-910n. The switching devices 745 may be directly mounted on a thin thermal pad sitting on top of the rectangular slots 910a-910n. This configuration can increase heat dissipation and prevent overheating of the switching devices 745.

Capacitor devices 750 may include any suitable number of capacitors. The capacitor devices 750 may be connected in parallel to each other to provide increased system reliability through redundancy. However, increasing the number of capacitor devices 750 connected in parallel may also increase the risk of unbalanced currents that may cause increased failure of capacitor devices 750. The total number of capacitor devices 750 connected in parallel may be optimized based on the winding current requirements of the system to provide a balance between increased redundancy and reducing the unbalanced currents.

Each of the capacitor devices 750 may be in direct electrical contact with the busbar assembly 740 (for example, each capacitor may be in direct electrical contact with a copper busbar of the busbar assembly 740). The direct electrical contact with the busbar assembly may enabled reduced electrical resistance and higher performance compared with systems where the capacitors are soldered to a PCB that is electrically connected to copper busbars using screws. The direct electrical contact between the capacitor devices 750 and the busbar assembly 740 may also reduce parasitic circuit components by shortening the current path and, thereby minimizing voltage spikes, EMI, and switching losses. Improved vibration resistance and cost reduction may also be achieved by avoiding the use of a PCB as intermediate layer between the capacitors and the copper busbar.

Figure 10:
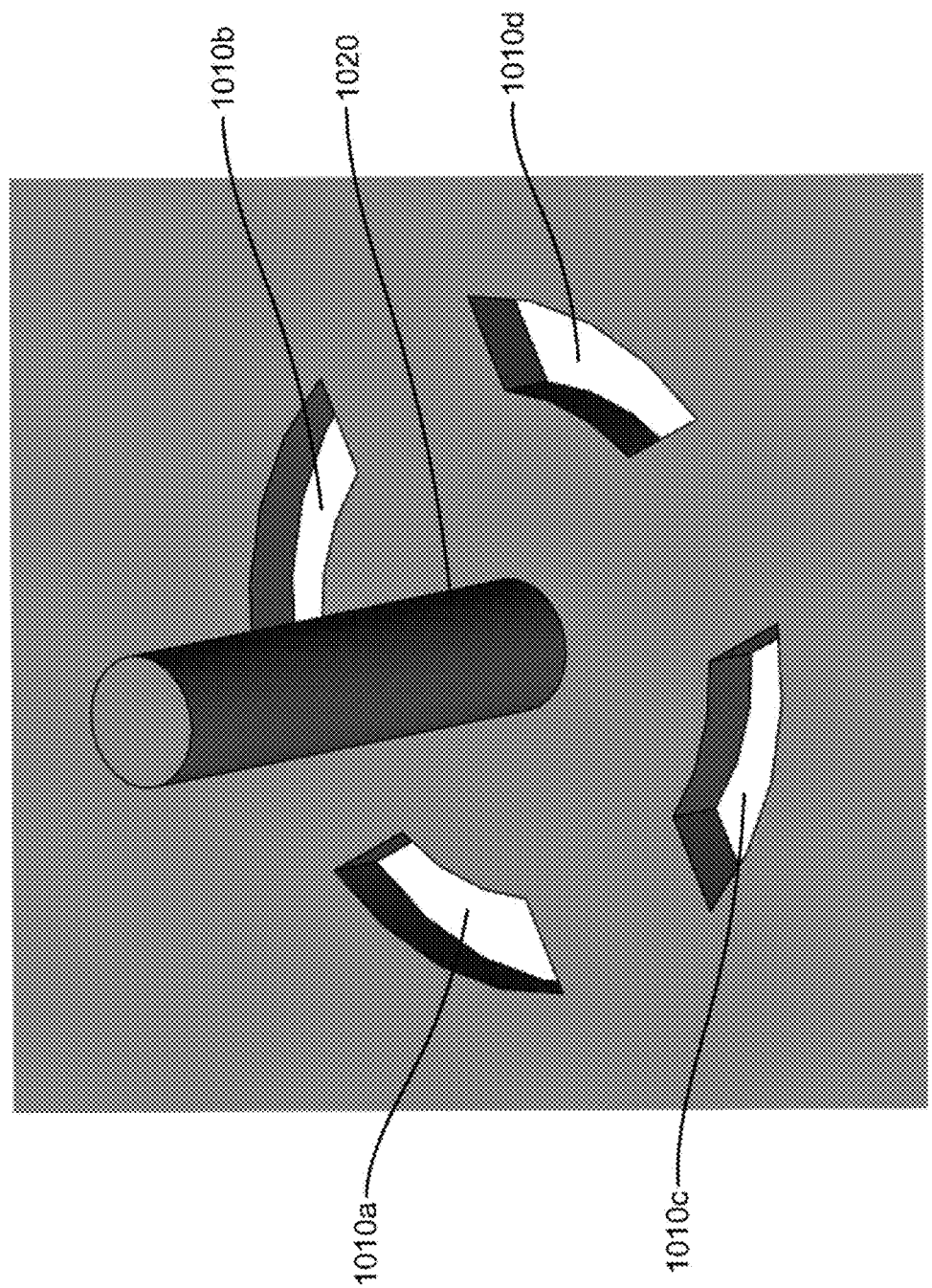
FIG. 10 is a schematic diagram showing example thermal cutout portions used for soldering capacitor devices of the inverter of FIG. 2.

In some embodiments, the copper busbars of busbar assembly 740 may have one or more thermal cutout portions configured to localize heat to soldering area during soldering operation of the multiple capacitor devices. Referring now to FIG. 10, illustrated therein is a schematic diagram showing example thermal cutout portions 1010a-1010d located around a pin 1020 that needs to be soldered. The ratio of removed material to localize heat during the soldering process may be determined using simulations and/or experiments to optimize the soldering process without interfering with the normal operation of the inverter.

The total number of switching devices 745 and/or capacitor devices 750 connected in parallel may be selected based on multiple factors, including for example, the power requirements of the switched reluctance motor drive system. The maximum number of devices may be limited based on mechanical limitations (e.g., available space), cost, reliability, and/or design complexity. The design complexity may have a significant impact on unbalanced currents. In an ideal scenario, power and signal currents may be shared identically between each device in parallel to reduce the risk of unbalanced currents. This may be achieved by designing the electrical current path on the copper busbars and control board 735 to be as similar as possible between the devices. Achieving similar electrical current paths can be more challenging as the number of parallel devices and design complexity increases, thereby increasing the risk of unbalanced currents.

In some embodiments, the inverter 220 may include a voltage sensor. The voltage sensor may have any suitable design to sense the DC input voltage provided to inverter 220. The voltage sensor may provide a DC input voltage signal to control board 735.

In some embodiments, the inverter 220 may include a current sensor. The current sensor may have any suitable design to sense AC current for at least one phase of the supplied electrical power to the coil windings of the switched reluctance motor. The current sensor may provide an AC current signal to control board 735.

In some embodiments, one or more thermistors may be positioned in proximity to the multiple switching devices 745 to provide a temperature signal indicating an operating temperature of the corresponding switching device. For example, thermistors may be located between parallel connected IGBT switching devices to monitor the operating temperature of the IGBT switching devices. The temperature signal may be provided, for example, to control board 735. Inverter 220 may include any suitable number of thermistors. For example, inverter 220 may include six thermistors. In other examples, inverter 220 may include fewer than six thermistors (e.g., 1 to 5) or greater than six thermistors (e.g., 7 to 12).

The control board 735 may be configured to control the supplied electrical power to the coil windings in response to the received DC input voltage signal, AC current signal, and/or temperature signal. This may enable inverter 220 to monitor the performance of the switched reluctance motor drive system and perform fault detection.

In some embodiments, the inverter may be configured to provide a fault response action in response to a detected fault. For example, control board 735 may implement a thermal control algorithm to compare the measured temperature values provided by the temperature signal with expected temperature values based on thermal analysis performed using the thermal control algorithm. Control board 735 can provide a thermal fault response action based on the deviation between the measure temperature values and expected temperature values. In some embodiments, the thermal fault response action may be a reduction in the winding current if the deviation is above a first temperature threshold value. The thermal fault response action may be a shutdown of the inverter if the deviation is above a second temperature threshold value.

As another example, control board 735 may implement a current control algorithm to compare the measured current values provided by the AC current signal with the expected current values based on current analysis performed using the current control algorithm. Control board 735 can provide a current fault response action based on the deviation between the measured current values and expected current values. In some embodiments, the current fault response action may be a reduction in the winding current if the deviation is above a first current threshold value. The current fault response action may be a shutdown of the inverter if the deviation is above a second current threshold value.

In some embodiments, inverter 220 may be configured to provide regenerative electrical braking action for the rotor shaft of the switched reluctance motor. This may enable reduction in usage and wear of the electromechanical brake of the switched reluctance motor and improve the efficiency of the switched reluctance motor drive system. If the DC power source of the wind turbine can receive the supplied energy from the regenerative electrical braking action, then the disclosed switched reluctance motor drive system may not require any additional structural components to provide the regenerative electrical braking action.

To provide regenerative electrical braking action, the kinetic energy stored in the rotating mechanical load of the switched reluctance motor may be converted to electrical energy when the motor is slowing down. In some embodiments, control board 735 may receive braking parameter data from a pitch angle control system of the wind turbine. The braking parameter data can provide an indication of the mechanical load of the switched reluctance motor, the total braking power needed and the capacity of an electrical system of the wind turbine to receive electrical energy from the regenerative electrical braking action.

Control board 735 may enable the regenerative electrical braking action by adjusting different control parameters (e.g., turn-on and turn-off angles, current reference, current shape) of the switched reluctance motor based on the received braking parameter data, the angular position of the rotor (provided by, for example, a rotor position signal) and/or the rotor velocity (provided by, for example, a rotor velocity signal). Control board 735 may then regulate the coil winding current for each phase to extract the kinetic energy of the slowing mechanical load and supply it to the electrical system of the wind turbine.

In some embodiments, control board 735 may be configured to provide historical performance data of the switched reluctance motor drive system to an external device. For example, control board 735 may provide the historical performance data to a pitch angle control system of the wind turbine. In some embodiments, control board 735 may provide the data via data connectors 725. The historical performance data may include motor speed data, motor current data, system temperature data, and/or system voltage data. The historical data may be analyzed and used to monitor the operation of the switched reluctance motor drive system and to troubleshoot any issues with the switched reluctance motor drive system.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Items

Item 1: A system for controlling a pitch angle of a blade of a wind turbine, the system comprising: a switched reluctance motor configured to be positioned at a hub of the wind turbine and coupled to the blade, wherein the motor has: a stator having (i) multiple stator poles and (ii) coil windings around each of the multiple stator poles; and a rotor rotatably mounted with respect to the stator, the rotor having multiple rotor poles and a rotor shaft configured to be coupled to the blade to control the pitch angle of the blade; and an inverter configured to supply electrical power to the coil windings to control motion of the rotor shaft in response to receiving a pitch angle control signal from a pitch angle control system of the wind turbine.

Item 2: The system of any preceding item, wherein the motor further has an incremental encoder configured to: sense (i) an angular position of the rotor relative to a reference position and (ii) a velocity of the rotor; and provide a rotor position signal indicating the angular position to the inverter; and provide a rotor velocity signal indicating the velocity to the inverter, and the inverter is further configured to control the supplied electrical power to the coil windings in response to the rotor position signal and the rotor velocity signal.

Item 3: The system of any preceding item, wherein the motor further has: an electro-mechanical brake to provide frictional braking action for the rotor shaft; and a spacer positioned between the electro-mechanical brake and the incremental encoder to shield the incremental encoder from magnetic field effects generated by the electro-mechanical brake.

Item 4: The system of any preceding item, wherein the inverter is further configured to: receive braking parameter data from the pitch angle control system; and control the supplied electrical power to the coil windings based on the angular position, the velocity, and the braking parameter data to provide regenerative electrical braking action for the rotor shaft.

Item 5: The system of any preceding item, wherein a core material of the stator and the rotor has lamination steels in a range from 0.34 mm to 0.5 mm.

Item 6: The system of any preceding item, further comprising a motor housing to provide a sealed housing enclosure for the motor, the sealed housing enclosure providing ingress protection against dust and water.

Item 7: The system of any preceding item, wherein a length of the motor housing is in a range from 400 mm to 550 mm.

Item 8: The system of any preceding item, wherein a total weight of the system is in a range from 95 kg to 105 kg.

Item 9: The system of any preceding item, wherein the rotor shaft is configured to be coupled to the blade via a gearbox assembly.

Item 10: The system of any preceding item, wherein the inverter has an inverter housing, the inverter housing being a gasket-sealed aluminum housing to provide ingress protection against dust and water.

Item 11: The system of any preceding item, wherein a volume of the inverter housing is in a range from 15.5 L to 17.5 L.

Item 12: The system of any preceding item, wherein the inverter further has multiple switching devices and multiple copper busbars, wherein each of the multiple switching devices is in direct electrical contact with at least one of the multiple copper busbars.

Item 13: The system of any preceding item, wherein the inverter further has a heatsink assembly having multiple fans configured to increase cooling air flow for the inverter and the multiple switching devices are directly mounted on the heatsink assembly for improved heat dissipation.

Item 14: The system of any preceding item, wherein the inverter is further configured to supply three-phase electrical power to the coil windings and the multiple copper busbars are arranged in a symmetrical layout configured to reduce unbalanced operation between the three phases.

Item 15: The system of any preceding item, wherein the inverter further has multiple capacitor devices and the multiple copper busbars have one or more thermal cutout portions configured to localize heat to soldering area during soldering operation of the multiple capacitor devices.

Item 16: The system of any preceding item, wherein the inverter further has: one or more thermistors positioned in proximity to one or more of the multiple switching devices and configured to provide a temperature signal to the inverter indicating an operating temperature of corresponding switching device; and the inverter is further configured to control the supplied electrical power to the coil windings in response to the temperature signal.

Item 17: The system of any preceding item, wherein the motor and/or the inverter further has one or more AC and/or DC connectors, wherein the one or more AC and/or DC connectors are IP68-rated.

Item 18: The system of any preceding item, wherein the inverter further has: a voltage sensor configured to sense DC input voltage provided to the inverter and provide a DC input voltage signal to the inverter; and a current sensor configured to sense AC current for at least one phase of the supplied electrical power to the coil windings and provide an AC current signal to the inverter, and the inverter is further configured to control the supplied electrical power to the coil windings in response to the DC input voltage signal and the AC current signal.

Item 19: The system of any preceding item, wherein the inverter is further configured to provide historical performance data of the system to an external device, the historical performance data having one or more of motor speed data, motor current data, system temperature data, and system voltage data.

Item 20: The system of any preceding item, wherein the inverter is further configured to receive input signals and provide output signals using one or more of a controller area network (CAN) communication protocol, a joint test action group (JTAG) standard and a RS-485 standard.

We claim:

1. A system for controlling a pitch angle of a blade of a wind turbine, the system comprising:
   a switched reluctance motor configured to be positioned at a hub of the wind turbine and coupled to the blade, wherein the motor has:
      a stator having (i) multiple stator poles and (ii) coil windings around each of the multiple stator poles; and
      a rotor rotatably mounted with respect to the stator, the rotor having multiple rotor poles and a rotor shaft configured to be coupled to the blade to control the pitch angle of the blade; and
   an inverter configured to supply electrical power to the coil windings to control motion of the rotor shaft in response to receiving a pitch angle control signal from the wind turbine, wherein the inverter has:
      a heatsink assembly having multiple fans configured to increase cooling air flow for the inverter; and
      multiple switching devices that are directly mounted on the heatsink assembly for improved heat dissipation.

2. The system of claim 1, wherein the motor further has an incremental encoder configured to:
   sense (i) an angular position of the rotor relative to a reference position and (ii) a velocity of the rotor; and
   provide a rotor position signal indicating the angular position to the inverter; and
   provide a rotor velocity signal indicating the velocity to the inverter, and the inverter is further configured to control the supplied electrical power to the coil windings in response to the rotor position signal and the rotor velocity signal.

3. The system of claim 2, wherein the motor further has: an electro-mechanical brake to provide frictional braking action for the rotor shaft; and
   a spacer positioned between the electro-mechanical brake and the incremental encoder to shield the incremental encoder from magnetic field effects generated by the electro-mechanical brake.

4. The system of claim 3, wherein the inverter is further configured to:
   receive braking parameter data from the wind turbine; and
   control the supplied electrical power to the coil windings based on the angular position, the velocity, and the braking parameter data to provide regenerative electrical braking action for the rotor shaft.

5. The system of claim 1, wherein a core material of the stator and the rotor has lamination steels in a range from 0.34 mm to 0.5 mm.

6. The system of claim 1, further comprising a motor housing to provide a sealed housing enclosure for the motor, the sealed housing enclosure providing ingress protection against dust and water.

7. The system of claim 6, wherein a length of the motor housing is in a range from 400 mm to 550 mm.

8. The system of claim 1, wherein a total weight of the system is in a range from 95 kg to 105 kg.

9. The system of claim 1, wherein the rotor shaft is configured to be coupled to the blade via a gearbox assembly.

10. The system of claim 1, wherein the inverter has an inverter housing, the inverter housing being a gasket-sealed aluminum housing to provide ingress protection against dust and water.

11. The system of claim 10, wherein a volume of the inverter housing is in a range from 15.5 L to 17.5 L.

12. The system of claim 1, wherein the inverter further has multiple copper busbars, wherein each of the multiple switching devices is in direct electrical contact with at least one of the multiple copper busbars.

13. The system of claim 12, wherein the inverter is further configured to supply three-phase electrical power to the coil windings and the multiple copper busbars are arranged in a symmetrical layout configured to reduce unbalanced operation between the three phases.

14. The system of claim 12, wherein the inverter further has multiple capacitor devices and the multiple copper busbars have one or more thermal cutout portions configured to localize heat to soldering area during soldering operation of the multiple capacitor devices.

15. The system of claim 1, wherein the inverter further has:
   one or more thermistors positioned in proximity to one or more of the multiple switching devices and configured to provide a temperature signal to the inverter indicating an operating temperature of corresponding switching device; and
   the inverter is further configured to control the supplied electrical power to the coil windings in response to the temperature signal.

16. The system of claim 1, wherein the motor and/or the inverter further has one or more AC and/or DC connectors, wherein the one or more AC and/or DC connectors are IP68-rated.

17. The system of claim 1, wherein the inverter further has:
   a voltage sensor configured to sense DC input voltage provided to the inverter and provide a DC input voltage signal to the inverter; and a current sensor configured to sense AC current for at least one phase of the supplied electrical power to the coil windings and provide an AC current signal to the inverter, and the inverter is further configured to control the supplied electrical power to the coil windings in response to the DC input voltage signal and the AC current signal.

18. The system of claim 1, wherein the inverter is further configured to provide historical performance data of the system to an external device, the historical performance data having one or more of motor speed data, motor current data, system temperature data, and system voltage data.

19. The system of claim 1, wherein the inverter is further configured to receive input signals and provide output signals using one or more of a controller area network (CAN) communication protocol, a joint test action group (JTAG) standard and a RS-485 standard.

* * * * *